United States Patent

Hashimoto et al.

[11] Patent Number: 5,949,609
[45] Date of Patent: Sep. 7, 1999

[54] RECORDING AND/OR REPRODUCING APPARATUS HAVING A TAPE LOADING DEVICE

[75] Inventors: Kouji Hashimoto, Chiba-ken; Hidetoshi Matsuoka; Junji Kobayashi, both of Tokyo, all of Japan

[73] Assignee: Canon Kabushiki Kaisha, Tokyo, Japan

[21] Appl. No.: 08/730,565

[22] Filed: Oct. 15, 1996

Related U.S. Application Data

[63] Continuation of application No. 08/282,079, Jul. 28, 1994, abandoned.

[51] Int. Cl.$^6$ .................................................. G11B 15/027
[52] U.S. Cl. ............................................................. 360/85
[58] Field of Search ........................................ 360/85, 95

[56] References Cited

U.S. PATENT DOCUMENTS

| | | |
|---|---|---|
| 4,754,347 | 6/1988 | Kodama ................................. 360/85 |
| 4,811,134 | 3/1989 | Takano ................................... 360/85 |
| 5,315,460 | 5/1994 | Takeda et al. ........................... 360/85 |
| 5,469,309 | 11/1995 | Konishi et al. ......................... 360/85 |

*Primary Examiner*—David D. Davis
*Attorney, Agent, or Firm*—Robin, Blecker & Daley

[57] ABSTRACT

An apparatus for recording and/or reproducing information on or from a tape by drawing out the tape contained in a cassette and bringing the tape into contact with a head, has a chassis and a base which are integrally formed, a slider provided with a member for drawing out the tape, the chassis having a reference surface. The base is provided with a positioning portion for positioning the slider. The positioning portion has a side which is formed in substantially parallel with a virtual line perpendicular to the reference surface of the chassis, or which is inclined away from the virtual line in the direction away from the reference surface of the chassis.

18 Claims, 7 Drawing Sheets

RECORDING AND/OR REPRODUCING APPARATUS HAVING A TAPE LOADING DEVICE

This is a continuation application under 37 CFR 1.62 of prior application Ser. No. 08/282,079 filed on Jul. 28, 1994 now abandoned.

BACKGROUND OF THE INVENTION

1. Field of the Invention

This invention relates to a tape loading device and a recording and/or reproducing apparatus, and particularly to a tape loading device for wrapping a magnetic tape around the circumferential surface of a rotary drum over a predetermined angle in a helical scanning type magnetic recording and/or reproducing apparatus using the magnetic tape as a recording medium, and an apparatus for recording and/or reproducing information on the tape wrapped around the rotary drum.

2. Description of the Related Art

A helical scanning type magnetic recording and/or reproducing apparatus such as a video tape recorder (VTR) or a digital audio tape recorder (DAT) is provided with a tape loading device for drawing a magnetic tape out of a tape cassette and wrapping the magnetic tape around the circumferential surface of a rotary drum over a predetermined angle in mounting the tape cassette.

In such a conventional tape loading device, since the device is large, the rotary drum is inclined, and guide posts are horizontally moved for obliquely wrapping the tape around the rotary drum. This simplifies the tape path, and decreases the number and inclination of the guide posts.

However, since the tape path is complicated, and the tape is thinned with recent miniaturization of the tape loading device, for example, thinning of the device, the inclination of the rotary drum is decreased, and the guide posts are obliquely moved for wrapping the tape. This causes the problem of damaging the tape and other problems.

In the conventional structure, since the guide posts are moved in parallel with the mounting reference surface (i.e., the chassis surface) of the tape loading device, the contact surface of a positioning member for positioning of a slider at the completion of loading is at right angles to the chassis surface.

However, in the recent thin structure in which the inclination of the rotary drum is decreased, and the guide posts are obliquely moved relative to the chassis surface, the contact surface of the positioning member for positioning of the slider of the guide post is at right angles to the surface of movement of the slider. When the positioning member is produced by molding a plastic material, a slide mechanism must thus be provided on a mold in order to release the product from the mold because a portion inclined with respect to the chassis surface cannot be released from the mold by simply dividing the mold into upper and lower parts. When the positioning member is produced by cutting, a tool for the inclined surface is required. The processability thus significantly deteriorates.

SUMMARY OF THE INVENTION

This invention aims to provide a recording and/or reproducing apparatus which can easily be processed and assembled, which is suitable for mass production and which can decrease the cost of manufacture.

In accordance with an embodiment of this invention, there is provided an apparatus for recording and/or reproducing information on or from a tape by drawing out the tape contained in a cassette and bringing the tape in contact with a head, the apparatus comprising a chassis having a reference surface, a slider provided with a member for drawing out the tape, and a base formed integrally with the chassis and provided with a positioning portion for positioning the slider. The positioning portion has a side which is formed in substantially parallel with a virtual line vertical to the reference surface of the chassis or which is inclined away from the virtual line in the direction away from the reference surface of the chassis.

In accordance with another embodiment, there is provided an apparatus for recording and/or reproducing information on or from a tape by drawing out the tape contained in a cassette and bringing the tape in contact with a head. The apparatus comprising a chassis having a reference surface, a drum unit provided with a rotary portion having the head and provided with a fixed portion for rotatably supporting the rotary portion, and a base formed integrally with the chassis and provided with a positioning the tape relative to portion for positioning the drum unit. The positioning portion has a side which is formed in substantially parallel with a virtual line vertical to the reference surface of the chassis, or which is inclined away from the virtual line in the direction away from the reference surface of the chassis.

The other objects and characteristics of this invention will be made clear from the description below and the attached drawings.

DETAILED DESCRIPTION OF THE PREFERRED EMBODIMENT

Figure 1:
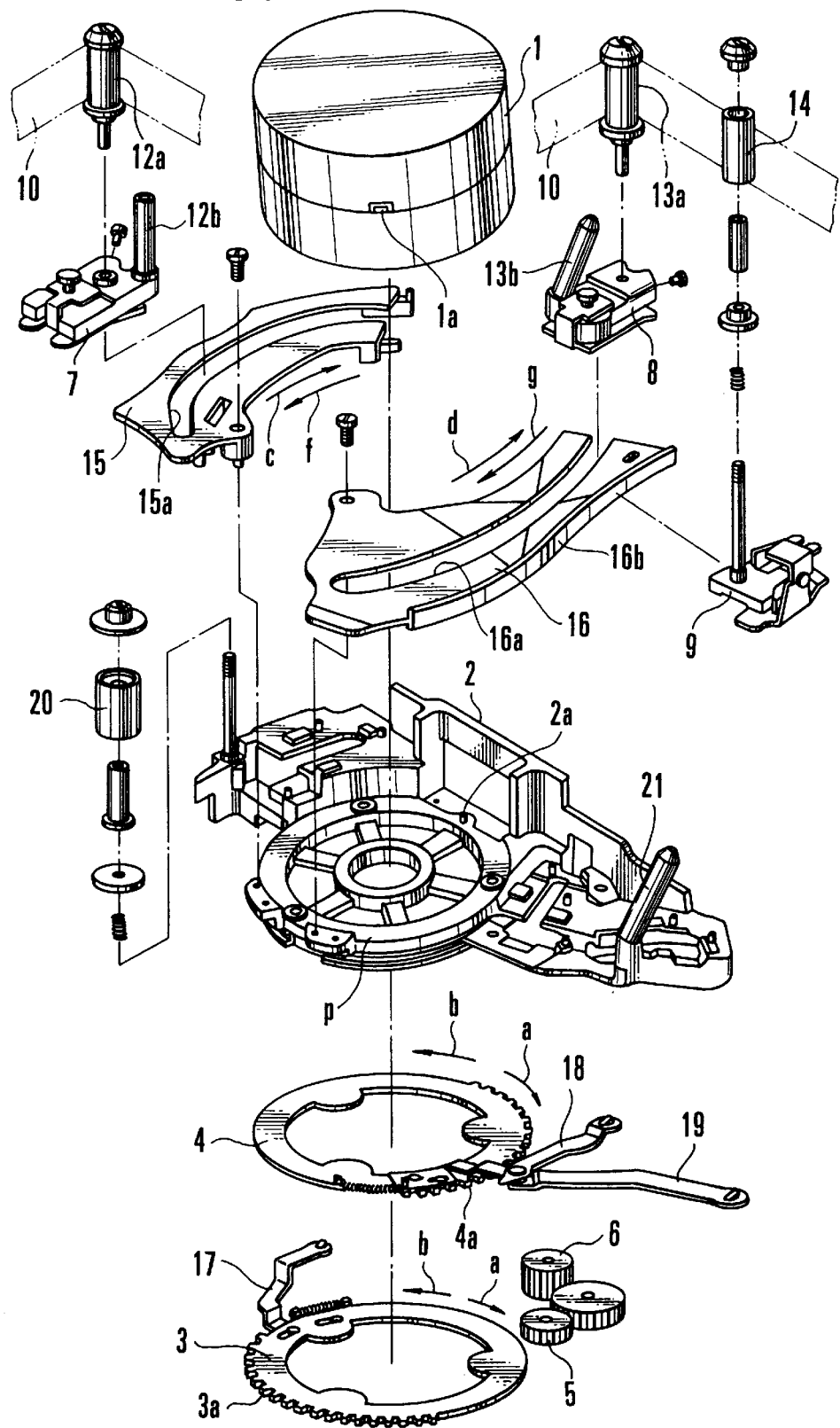
FIG. 1 is an exploded perspective view illustrating the whole construction of an apparatus in accordance with an embodiment of this invention.
Figure 2:
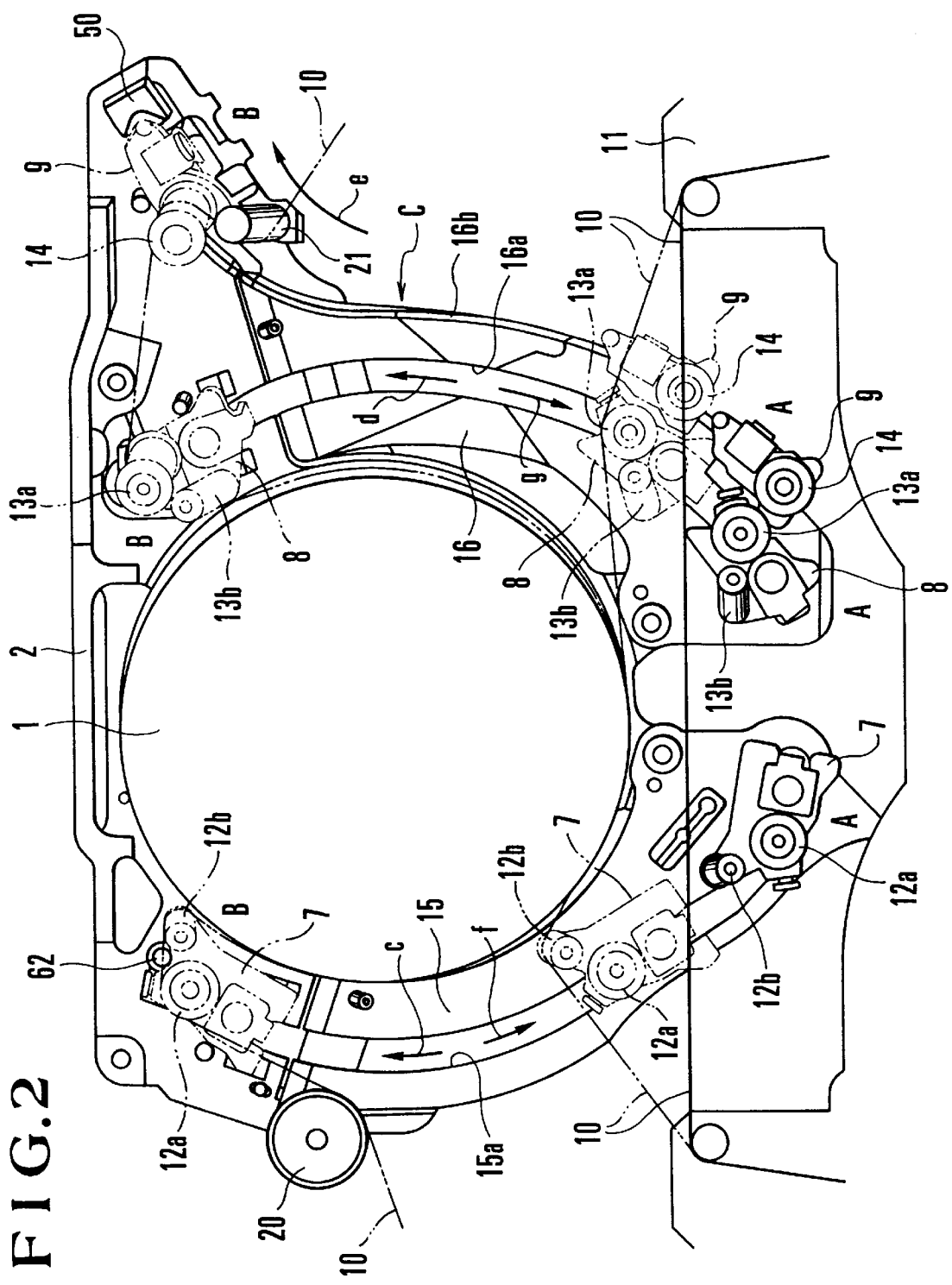
FIG. 2 is a plan view illustrating the whole construction of the apparatus in accordance with the embodiment.

FIGS. 1 and 2 are an exploded perspective view and a plan view, respectively, of the whole construction of an apparatus. The basic construction and operation of an apparatus in accordance with an embodiment of this invention are described with reference to these drawings.

Reference numeral 1 denotes a rotary drum on which a magnetic head 1a is mounted, and which is supported on a drum base 2. Reference numerals 3 and 4 each denote a loading ring (referred to as "ring" hereinafter) which is mounted on the lower portion of the drum base 2 so as to rotate concentrically with the rotary drum 1. Drive gears 5 and 6 are engaged with the tooth portions 3a and 4a formed in the outer peripheries of the loading rings 3 and 4, respectively.

Reference numerals 7, 8 and 9 each denote a slider having a guide post provided thereon for drawing a magnetic tape 10 out of a tape cassette 11 and wrapping the tape 10 around the circumferential surface of the rotary drum 1 over a predetermined angle. The guide post on the slider 7 comprises a rotary post 12a and a fixed post 12b, the guide post on the slider 8 comprises a rotary post 13a and a fixed post 13b, and the guide post on the slider 9 comprises a rotary post 14.

Reference numeral 15 denotes a rail member for guiding the slider 7 along a slot 15a, and reference numeral 16 denotes a rail member for guiding the sliders 8 and 9 along a slot 16a and a projection 16b, respectively. The rail members 15 and 16 are mounted on the drum base 2 and arranged outside the rotary drum 1. Reference numeral 17 denotes an arm for connecting the slider 7 and the ring 3, and reference numerals 18 and 19 denote arms for connecting the ring 4 and the sliders 8 and 9, respectively.

On the upper side of the drum base 2 are provided a rotary post 20 and a fixed post 21, and a positioning member connected to the rail members 15 and 16 so as to position the sliders 7, 8 and 9.

In the above-described construction, in mounting the tape cassette 11, the sliders 7, 8 and 9, i.e., the posts 12a, 12b, 13a, 13b and 14, are moved to a loading standby position A on the reverse side of the tape 10, as shown by solid lines in FIG. 2.

After the tape cassette 11 is mounted, the rings 3 and 4 are rotated in the opposite directions of arrows a and b by a motor (not shown) through the drive gears 5 and 6, respectively. The rotation of the ring 3 causes the slider 7 to be guided along the slot 15a of the rail member 15 and moved in the direction of arrow c through the arm 17. The rotation of the ring 4 causes the sliders 8 and 9 to be guided by the slot 16a and the projection 16b of the rail member 16 and moved in the direction of arrow d through the arms 18 and 19, respectively.

The movement of the sliders 7, 8 and 9 causes the posts 12a, 12b, 13a, 13b and 14 to draw the tape 10 out of the tape cassette 11 and wrap the tape 10 around the circumferential surface of the rotary drum 1, as shown by one-dot chain lines in FIG. 2.

Each of the sliders 7, 8 and 9 is further moved to a loading completion position B shown by two-dot chain lines in FIG. 2. At the loading completion position B, the tape 10 is wrapped around the circumferential surface of the rotary drum 1 over a predetermined angle, and loaded on a predetermined travel passage. The slider 9 is moved along the outer periphery of the rotary drum 1 up to an intermediate point C in the course of loading, and moved from the point C in the direction of arrow e. In the state where loading is completed, the tape 10 is traveled for desired recording or reproducing.

In unloading, the rings 3 and 4 are rotated in the directions of the arrows b and a, respectively, so that the sliders 7, 8 and 9 are backwardly moved along the rail members 15 and 16 in the directions of the arrows f and g, respectively. As a result, each of the posts 12a, 12b, 13a, 13b and 14 is moved from the loading completion position B to the loading standby position A.

The construction characteristic of the embodiment is described below.

In this embodiment, the track side of each of the rail members for guiding the sliders comprises surfaces vertical to a plurality of surfaces at different angles.

Figure 3:
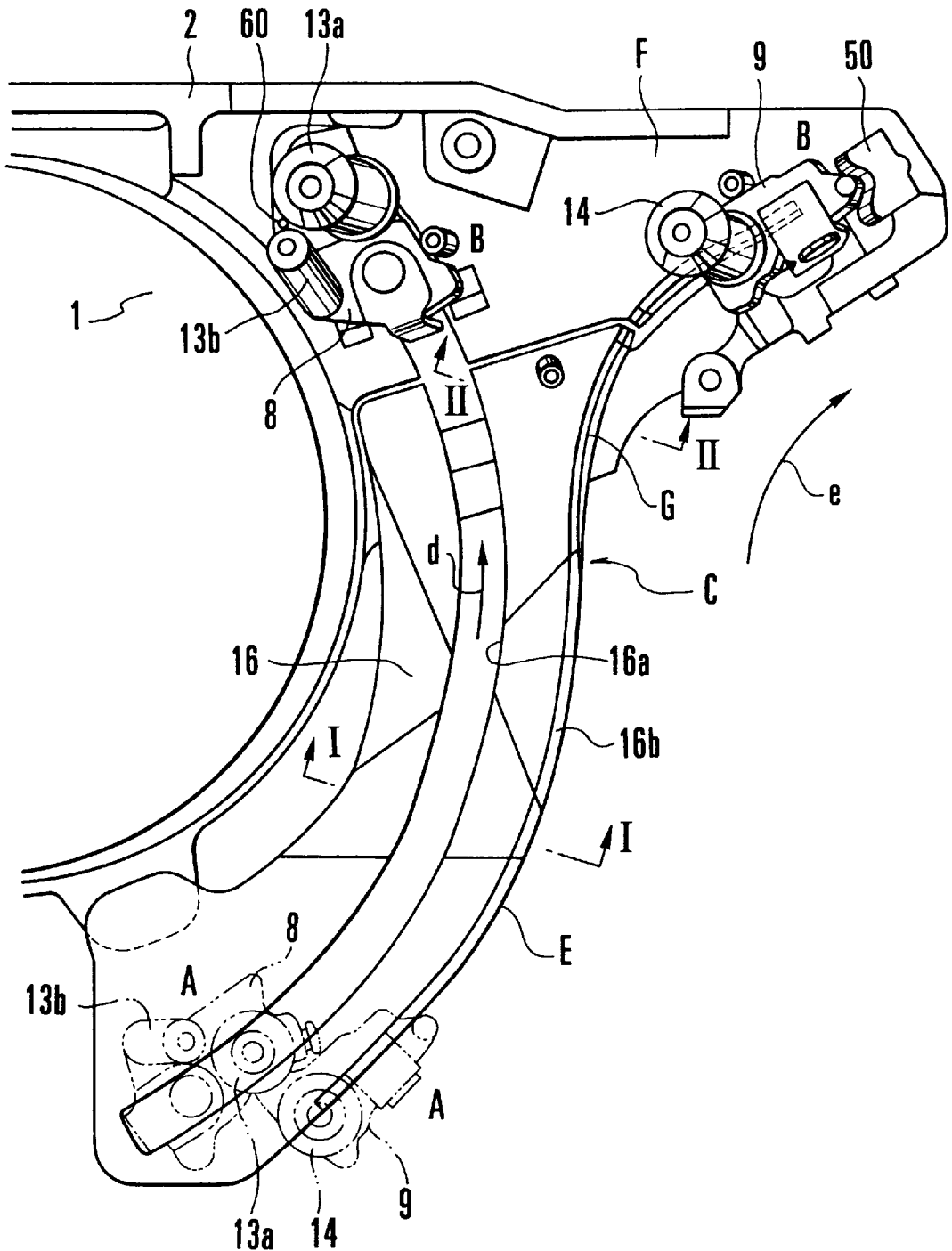
FIG. 3 is an enlarged plan view illustrating a principal portion of the construction of a track side of a rail member in the embodiment.
Figure 4A:
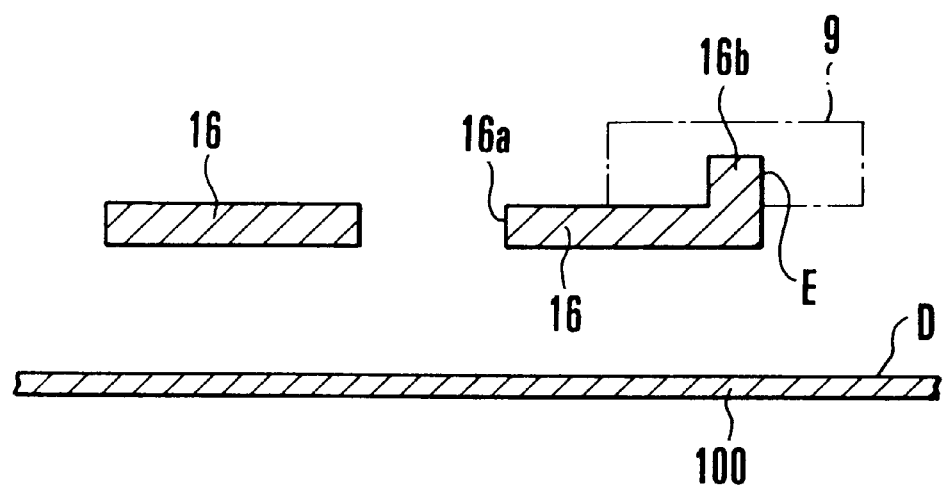
FIG. 4(A) is an enlarged sectional view taken along line I—I in FIG. 3.
Figure 4B:
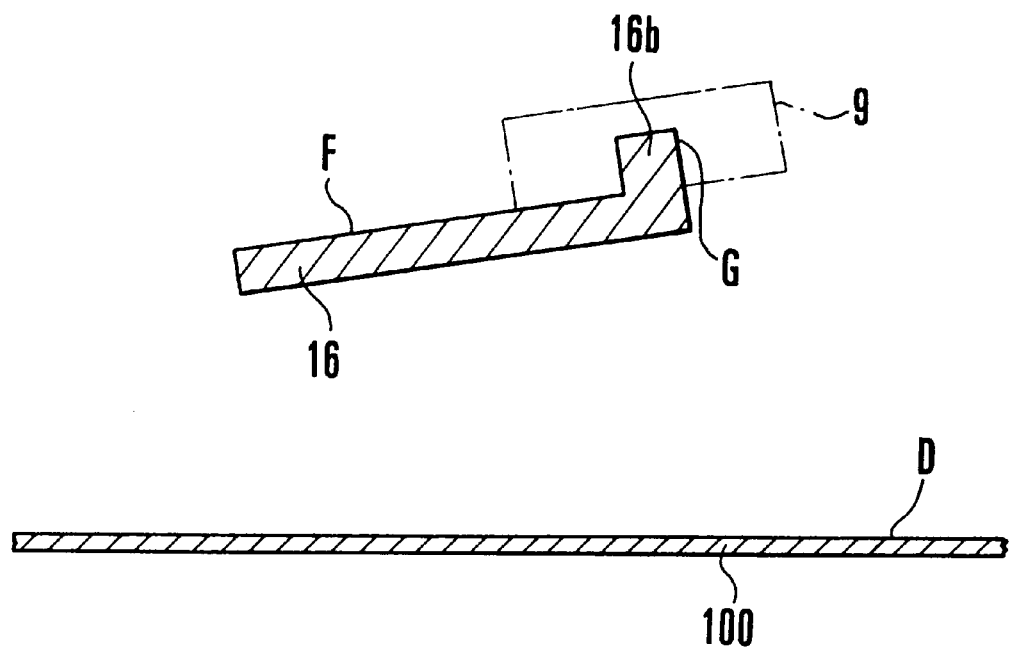
FIG. 4(B) is an en larged sectional view taken along line II—II in FIG. 3.

FIG. 3 is an enlarged plan view illustrating a principal portion of the characteristic construction, FIG. 4(A) is an enlarged sectional view taken along line I—I in FIG. 3, and FIG. 4(B) is an enlarged sectional view taken along line II—II in FIG. 3.

The track side of the rail member 16 for guiding the slider 9, i.e., the side of the projection 16b, comprises a surface E vertical to a mounting reference surface D (referred to as "chassis surface D" hereinafter) for the drum base 2 within the region from the loading standby position A to the point C in the course of loading, and a surface G vertical to an inclined surface F on the drum base 2 within the region from the point C to the loading completion position B. In the vicinity of the point C, the surface E smoothly changes to the surface G.

When the tape cassette 11 is mounted, and loading is started, the slider 9 is guided by the surface E of the track side of the rail member 16 to move along the outer periphery of the rotary drum 1 in the direction of the arrow d. At the point C, the track side of the rail member 16 changes to the surface G vertical to the surface F on the drum base 2 so that the slider 9 is guided by the surface G to move to the loading completion position B in the direction of the arrow e. At the loading completion position B, the slider 9 and the rotary post 14 have an inclination, as shown in the drawings.

As described above, in the apparatus of this embodiment, since the track side of the rail member 16 for guiding the slider 9 comprises surfaces (surfaces E and G) vertical to a plurality of surfaces (surfaces D and F) at different angles, the slider 9, i.e., the rotary post 14, can easily and smoothly be moved with an inclination along a single movement passage even if the number of the guide posts and the inclination thereof are increased. It is thus possible to significantly decrease the load on the tape in loading, and prevent the damage of the tape and other problems.

The positioning member for the slider 9 in this embodiment is described below.

Figure 5:
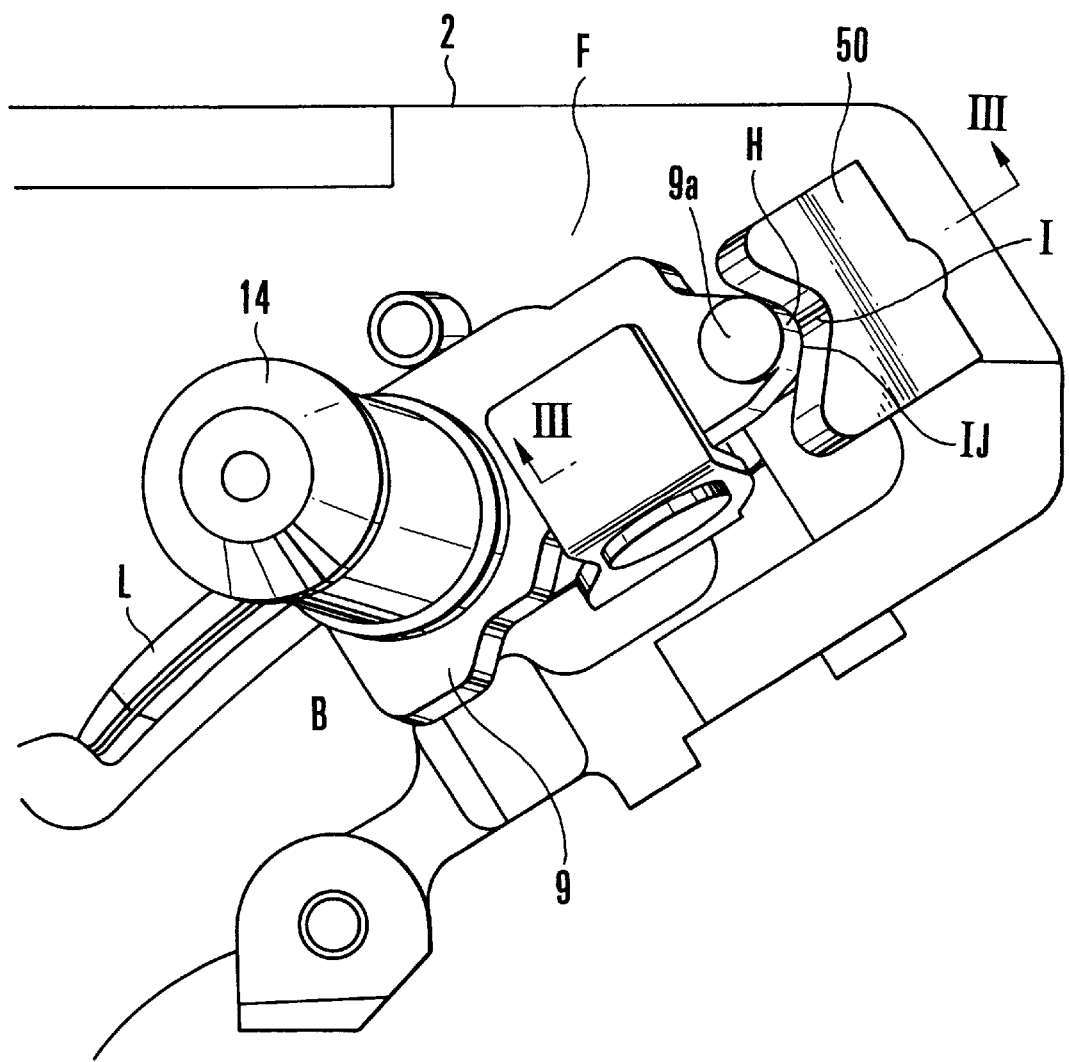
FIG. 5 is an enlarged plan view illustrating a principal portion including a slider and a positioning member in the embodiment.
Figure 6A:
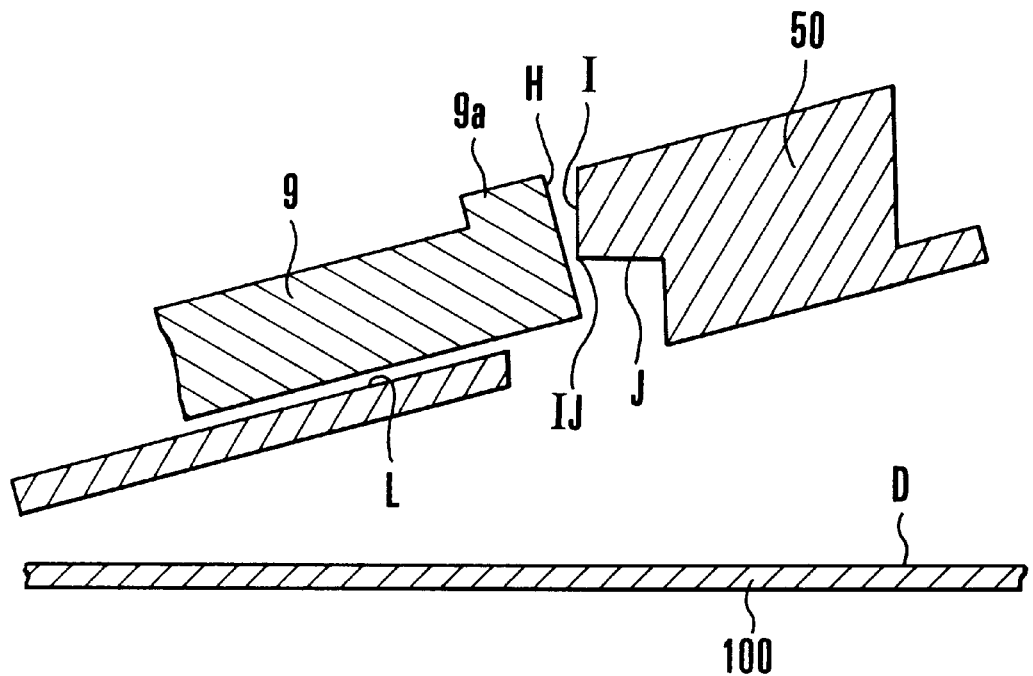
FIG. 6(A) is a sectional view taken along line III—III in FIG. 5.
Figure 6B:
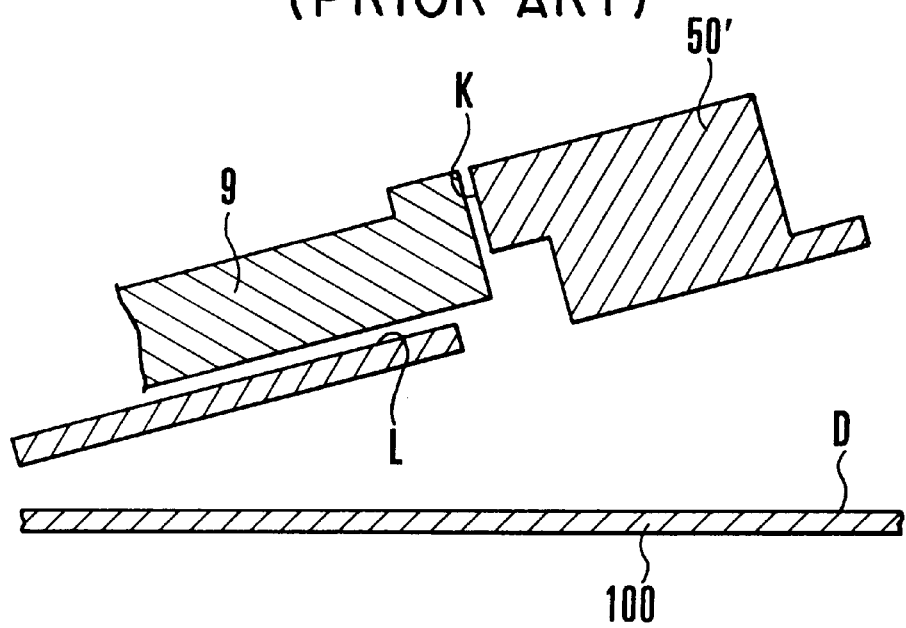
FIG. 6(B) is a sectional view illustrating a comparative reference example similar to FIG. 6(A)

FIG. 5 is an enlarged plan view illustrating a principal portion of the characteristic construction, FIG. 6(A) is a sectional view taken along line III—III in FIG. 5, and FIG. 6(B) is a sectional view of a comparative reference example similar to FIG. 6(A).

Reference numeral 50 denotes a positioning member for positioning the slider 9 on a surface F inclined with respect to the chassis surface D at the completion of loading, the positioning member 50 comprising a V-shaped block. The positioning member 50 is provided integrally with the drum base 2, and can be integrally formed by a synthetic resin. A cylindrical portion 9a is formed at the front end of the slider 9, and a surface H of the cylindrical portion 9a comes into contact with a contact surface I of the positioning member 50. The contact surface I of the positioning member 50 is formed by a surface vertical to the chassis surface D.

FIG. 6(B) shows an example in which a general construction is applied to this embodiment. In this example, the contact surface K of a positioning member 50' for positioning the slider 9 is formed by a surface vertical to the movement track side L of the slider 9. Since the slider 9 is received by the surfaces, when the slider 9 is obliquely moved with respect to the chassis surface D, the contact surface K of the positioning member 50' must be inclined with respect to the chassis surface However, in the apparatus of this embodiment, the surface I serving as a contact surface of the positioning member 50 need not be vertical to the movement track surface L of the slider 9 because the surface H of the cylindrical portion 9a of the slider 9 is received by the line IJ which is the crossline of the surfaces I and J of the positioning member 50, as shown in FIG. 6(A). Therefore, the surface I can be formed by a surface vertical to the chassis surface D.

As described above, in the apparatus of this embodiment, the contact surface I of the positioning member 50 with which the slider 9 comes into contact is formed by a surface vertical to the chassis surface D even in the tape path in which the slider 9 is moved obliquely with respect to the chassis surface D. When the positioning member 50 is formed by molding a plastic material, therefore, a slide mechanism need not be provided on a mold. The structure of the mold can thus be simplified, and an attempt can be made to decrease the cost. When the positioning member 50 is produced by cutting, since a surface parallel to the chassis surface D can be processed, a tool for an inclined surface need not be produced, thereby decreasing the processing time.

Figure 7:
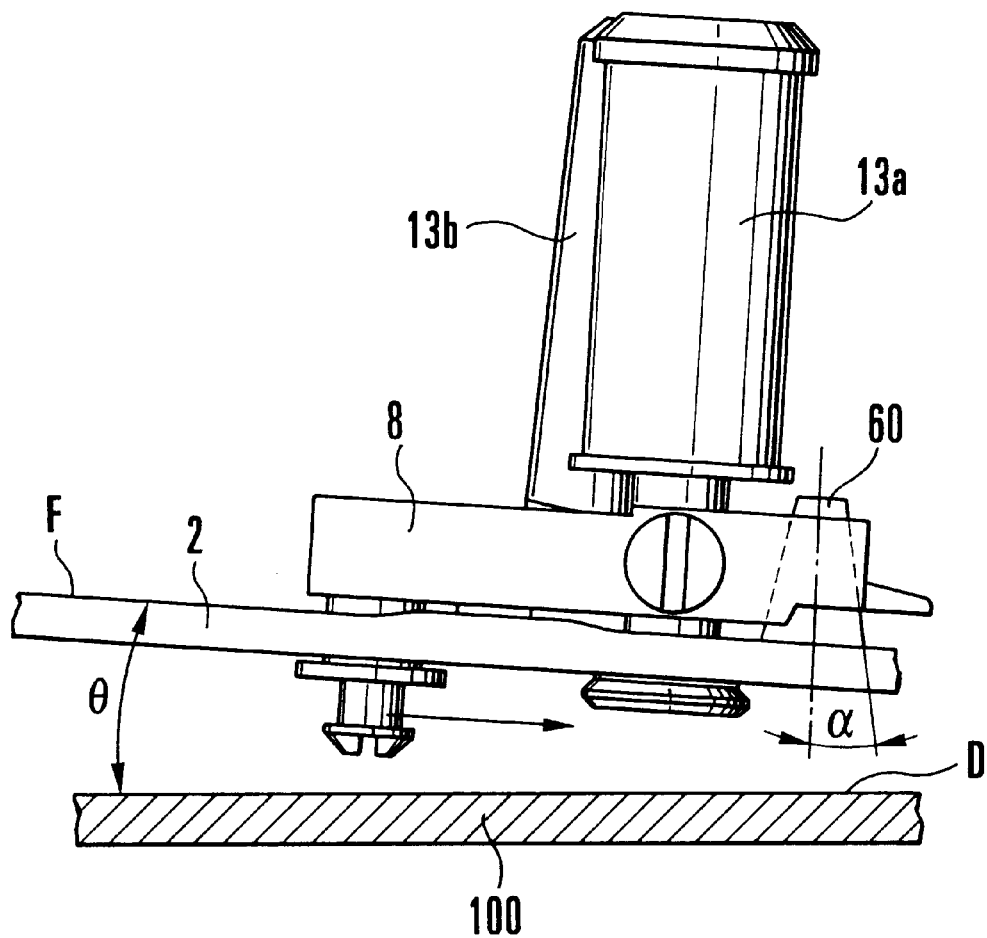
FIG. 7 is an enlarged side view illustrating a principal portion including a slider different from that shown in FIG. 5 and a positioning member in the embodiment.

The positioning member for the slider 8 in this embodiment is described below. FIG. 7 is a view illustrating a principal portion of the characteristic construction.

The surface F of the drum base 2 is inclined only at an angle θ with respect to the chassis surface D. A positioning pin 60 for stopping the slider 8 at the loading completion position B has a taper angle α equivalent to or slightly greater than the angle θ of the surface F of the drum base 2, which is inclined with respect to the chassis surface D, and is formed so that the center line of the positioning pin 60 is vertical to the drum base 2.

In the above construction, since the positioning pin 60 has the taper angle α greater than the inclination angle θ of the surface F with respect to the chassis surface D, and is formed to be vertical to the drum base 2, the positioning pin 60 can be released from a mold upwardly with respect to the chassis surface D. It is thus possible to easily integrally mold the drum base 2 having the positioning pin 60 and the chassis 100, facilitate mass production and decrease the cost.

In this embodiment, the above construction is also employed in the relation between the slider 7 and the positioning pin 62 (refer to FIG. 2).

Although, in the construction of this embodiment, the positioning mechanism for the slider 9 is different from the positioning mechanism for the slider 8 or 7, both positioning mechanisms may be opposite to each other, or only one of the mechanisms may be employed.

Further, in the construction of this embodiment, the positioning pin 60 for stopping the slider 8 at the loading completion position B has the taper angle α which is equivalent to or slightly greater than the inclination angle θ of the surface F of the drum base 2 with respect to the surface D of the chassis 100, and if formed so that the center line thereof is vertical to the drum base 2. In addition, a positioning pin 2a (FIG. 1) provided on the surface of the drum base 2 so as to position the drum around which the recording tape is wrapped, at a predetermined position, other than the positioning pin 60 for the slider 8, also has a taper angle a which is equivalent to or slightly greater than the inclination angle θ of the surface P (FIG. 1) of the drum base 2 with respect to the chassis surface D, and is formed so as to be vertical to the surface P of the drum base 2. Since the positioning pin 2a can thus be released from a mold upwardly with respect to the chassis surface D, the drum base 2 and the chassis 100 can easily be integrally molded. This facilitates assembly and mass production, and can decrease the cost.

Although this invention is described with reference to the embodiment, this invention is not limited to the embodiment, and various effective modifications and applications can be made on the basis of the technical idea of this invention. For example, although the embodiment uses the mechanism for moving the sliders, i.e., the guide posts, by the loading rings, this invention can be applied to an apparatus provided with a link type loading mechanism or a rail docking system.

What is claimed is:

1. An apparatus for recording and/or reproducing information on or from a tape by drawing out the tape contained in a cassette and bringing the tape into contact with a head, said apparatus comprising:

(a) a chassis having a reference surface;
    (b) a slider provided with a member for drawing out the tape, said slider moving in a posture inclined relative to the reference surface of the chassis; and
    (c) a base formed integrally with said chassis and provided with a positioning portion for positioning said slider in the posture inclined relative to the reference surface of the chassis, said positioning portion comprising a pin member which has a bottom end adjacent said base and a top end opposite said bottom end, said pin member being tapered toward said top end of said pin member at an acute angle relative to a virtual line orthogonal to the reference surface of said chassis so that said top end of said pin member is smaller than said bottom end of said pin member, and when the slider is set at the positioning portion, said pin member engages said slider.

2. An apparatus according to claim 1, wherein said base includes at least a part of a guide portion for guiding said slider.

3. An apparatus according to claim 2, wherein said guide portion has an inclination θ with respect to the reference surface of said chassis.

4. An apparatus according to claim 3, wherein a taper angle of said pin member is greater than the inclination θ of said guide portion.

5. A tape loading device for drawing out a tape wound around a pair of reels, comprising:

(a) a chassis having a reference surface;
    (b) a slider provided with a member for drawing out the tape, said slider moving in a posture inclined relative to the reference surface of the chassis; and
    (c) a base formed integrally with said chassis and provided with a positioning portion for positioning said slider in the posture inclined relative to the reference surface of the chassis, said positioning portion comprising a pin member which has a bottom end adjacent said base and a top end opposite said bottom end, said pin member being tapered toward said top end of said pin member at an acute angle relative to a virtual line orthogonal to the reference surface of said chassis so that said top end of said pin member is smaller than said bottom end of said pin member, and when said slider is set at the positioning portion, said pin member engages with said slider.

6. A tape loading device according to claim 5, wherein said base includes at least a part of a guide portion for guiding said slider.

7. A tape loading device according to claim 6, wherein said guide portion has an inclination θ with respect to the reference surface of said chassis.

8. A tape loading device according to claim 7, wherein a taper angle of said pin is greater than the inclination θ of said guide portion.

9. An apparatus for recording and/or reproducing information on or from a tape by drawing out the tape contained in a cassette and bringing the tape into contact with a head, comprising:

(a) a chassis having a reference surface;

(b) a drum unit having a rotary portion and a fixed portion for rotably supporting said rotary portion, said rotary portion having said head; and (c) a base formed integrally with said chassis and provided with a positioning portion for positioning said drum unit in a posture inclined relative to the reference surface of the chassis, said positioning portion comprising a pin member which has a bottom end adjacent said base and a top end opposite said bottom end; said pin member being tapered toward said top end of said pin member at an acute angle relative to a virtual line orthogonal to the reference surface of said chassis so that said top end of said pin member is smaller than said bottom end of said pin member, wherein said pin member engages with said drum unit.

10. An apparatus according to claim 9, wherein said base includes at least a part of a guide portion for guiding a slider having a member for drawing out the tape.

11. An apparatus according to claim 10, wherein said guide portion has an inclination θ with respect to the reference surface of said chassis.

12. An apparatus according to claim 11, wherein a taper angle of said pin member is greater than the inclination θ of said guide portion.

13. An apparatus for recording and/or reproducing information on or from a tape by drawing out the tape contained in a cassette and bringing the tape into contact with a head, said apparatus comprising:

(a) a chassis having a reference surface;

(b) a slider provided with a member for drawing out the tape, said slider moving in a position inclined relative to the reference surface of the chassis; and (c) a base formed integrally with said chassis and provided with a positioning portion for positioning said slider in the posture inclined relative to the reference surface of the chassis and when the slider is set at the positioning portion, an edge of one of said slider and said positioning portion contacts a surface of the other of said slider and said positioning portion, a surface of said positioning portion having a side which is formed substantially in parallel with a virtual line orthogonal to the reference surface of said chassis.

14. An apparatus according to claim 13, wherein said base includes at least a part of a guide portion for guiding said slider.

15. An apparatus in accordance with claim 14, wherein said guide portion has an inclination θ with respect to the reference surface of said chassis.

16. A tape loading device for drawing out a tape wound around a pair of reels, comprising:

(a) a chassis having a reference surface;

(b) a slider provided with a member for drawing out the tape, said slider moving in a posture inclined relative to the reference surface of the chassis; and (c) a base formed integrally with said chassis and provided with a positioning portion for positioning said slider in the posture inclined relative to the reference surface of the chassis and when the slider is set at the positioning portion, an edge of one of said slider and said positioning portion contacts a surface of the other of said slider and said positioning portion, a surface of said positioning portion having a side which is formed substantially in parallel with a virtual line orthogonal to the reference surface of said chassis.

17. A tape loading device according to claim 16 wherein said base includes at least a part of a guide portion for guiding said slider.

18. A tape loading device according to claim 17 wherein said guide portion has an inclination θ with respect to the reference surface of said chassis.

* * * * *

UNITED STATES PATENT AND TRADEMARK OFFICE
CERTIFICATE OF CORRECTION

PATENT NO. : 5,949,609
DATED : September 7, 1999
INVENTOR(S) : Kouji Hashimoto, et al.

It is certified that error appears in the above-identified patent and that said Letters Patent are hereby corrected as shown below:

Col. 5, line 59, delete "angle a" and insert -- angle $\alpha$ --.

Signed and Sealed this

Third Day of April, 2001

Attest:

NICHOLAS P. GODICI

*Attesting Officer*      *Acting Director of the United States Patent and Trademark Office*